Dec. 29, 1964  L. J. SCHELL, JR., ETAL  3,163,456
LAWN AERATOR
Filed Jan. 11, 1962

INVENTORS.
LIGUORI J. SCHELL, JR.
MICHAEL J. PETTI
BY
Meyer, Baldwin, Doran & Egan
ATTORNEYS.

United States Patent Office 3,163,456
Patented Dec. 29, 1964

3,163,456
LAWN AERATOR
Liguori J. Schell, Jr., 3557 Ludgate Road, Shaker Heights, Ohio, and Michael J. Petti, 911 S. Green Road, South Euclid, Ohio
Filed Jan. 11, 1962, Ser. No. 165,506
1 Claim. (Cl. 294—50.7)

This invention relates to a tool for lawn culture and more particularly to a tool especially adapted for aerating the soil and feeding moisture to grass roots.

An object of the invention is to provide a tool of this nature which can be readily and economically manufactured from easily available materials.

A further object of the invention is to provide an aerating tool which can be assembled and dis-assembled by the user for cleaning, storing, painting, rust preventive treatment, blade changing, etc.

A further object of the invention is to provide a tool which is of light weight so as to be readily portable; which nevertheless operates by its own weight without mechanical power and without the necessity of laborious manual propulsion.

A further object of the invention is to provide a tool having self-contained receptacle facilities for holding the soil fragments or plugs picked up by the soil cutting part of the tool, and retaining such plugs until they can be conveniently deposited for subsequent use, such as filling low spots, etc.

Other objects and advantages will be apparent from a study of the following description of several embodiments of the invention in conjunction with the accompanying drawings in which.

Figure 1:
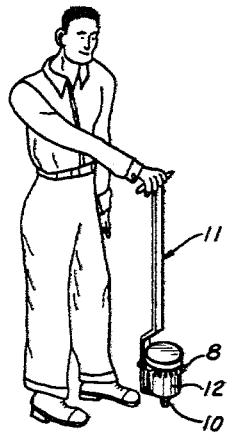
FIG. 1 is a sketch showing the aerating tool in operating position, its scale of size being roughly indicated by comparison with that of an operator.
Figure 2:
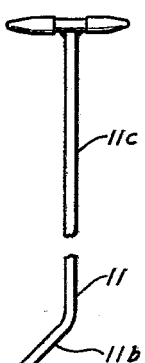
FIG. 2 is a view of the tool, partly in side elevation and partly in central vertical section, and on an enlarged scale.
Figure 3:
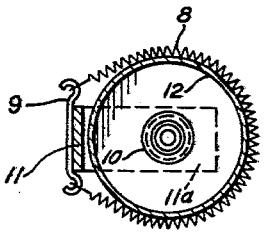
FIG. 3 is a horizontal sectional view taken on the line 3—3 of FIG. 2.

Proceeding now to a description of our invention, the tool includes a tubular nipple 10 having an aperture extending completely therethrough and an annular cutting edge 10a. The aperture preferably increases in diametrical extent upwardly, at least over a substantial portion of its length so as to facilitate upward movement of plugs of soil 7 cut by the tool. This increase in diameter may include a tapered part 10b and an outwardly shouldered upper end 10c. The end 10c is externally threaded.

A handle member 11 carries a receptacle or container 12 which has a central aperture in its bottom through which the upper end of the cutter 10 extends. The handle is angularly bent at its lower end to provide a support portion 11a on which the container 12 rests. The external threads on the cutter match threads in a hole through the handle part 11a so that the cutter may be rotatably inserted in this hole which is in registry with the aperture in the bottom of the container 12. A lock nut 13 securely retains the cutter in position until its is desirable to remove it for sharpening, replacement, or otherwise. While we prefer to use the container 12, the tool may be used without it.

The size of the diametrical aperture in the cutter, and the length of its extension both below the bottom of the container and above it interiorly are factors which may be changed to suit particular needs. Obviously the extent to which the cutter protrudes below the bottom of the container determines the depth of the aerating aperture in the soil, so this may be adjustably controlled by rotating the cutter in its threads, upwardly or downwardly, and then tightening the lock nut. The container may be held in place by a coil spring 8 secured at its ends to clip 9 which is secured to the handle 11.

Operation of the tool is extremely simple. The operator merely walks along the lawn dropping the assembly with the cutting member 10 downwardly, and picking it up again. By reason of the inset upper portion of the handle, as shown at 11b, the aerator will hang substantially vertically in the operator's hand, since the top portion 11c of the handle is approximately in alignment with the center of gravity. Each time it is dropped a plug of soil forces its way upwardly into the bore in the cutter 10, and each succeeding plug causes the one ahead of it to work up and eventually into container 12. No force is needed since the weight of the assembled tool furnishes sufficient impetus to cause the cutter to sink at least as far as the shouldered enlargement 10c. The inner divergence 10b affords clearance for the rising plugs to make the operation easier.

Periodically the plugs in the container may be emptied into a larger receptacle, for future use.

The operation just described is so simple that it can easily be performed by a woman or a child while walking around on the lawn in any selected pattern and at any frequency of perforations desirable for the particular character of the turf.

Figure 4:
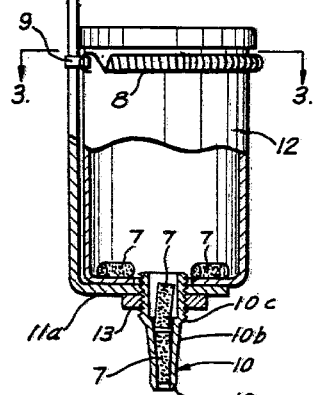
FIG. 4 is a view, partly in side elevation and partly in central vertical section, showing another embodiment of the invention.
Figure 4:
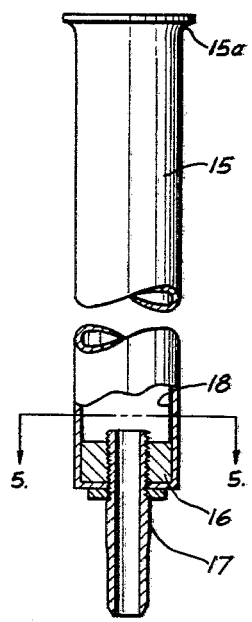
Figure 5:
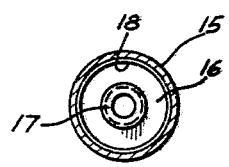
FIG. 5 is a horizontal sectional view taken on the line 5—5 of FIG. 4.

A second embodiment of the invention is shown in FIG. 4. In this embodiment the part 15 serves both as a container and a manipulating handle. It is formed for example from thin walled conduit flared out at 15a to prevent slippage. It may be of a suitable length to avoid causing the user to stoop too far in raising it. A welded and fitted disc 16 is centrally bored to provide a threaded aperture for the cutter 17. We show the inner wall of the container as being lined with some protective plastic material of low frictional characteristics, the lining being shown at 18. The procedure in use is otherwise the same as in the previously described embodiment.

Figure 6:
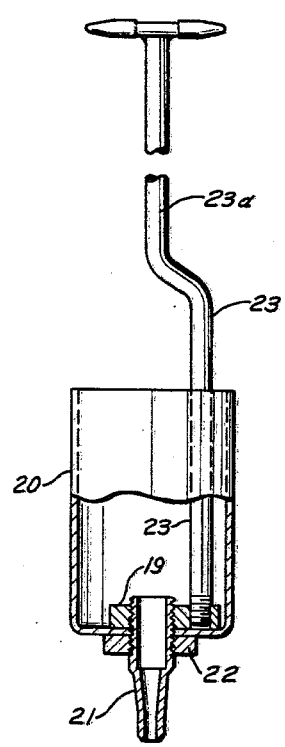
FIG. 6 is a view similar to FIG. 4 but showing yet another embodiment of our invention.

FIG. 6 shows another embodiment of the invention wherein a block 19 is held within container 20 by reason of the threaded engagement of the cutter 21 within an aperture in the block. A lock nut 22 secures the assembly. The handle 23 has its lower end threaded into the block as shown. Here also the top portion 23a of the handle is aligned with the cutter and with the center of gravity.

The container 12 and the conduit 15 may be formed either from metal or from one of the many suitable plastic materials.

What is claimed is:

An aerating tool including a container having a bottom wall, said bottom wall having an aperture therein, a cutting member in said aperture fixed with respect to said container substantially in alignment with the center of gravity of said container and having a portion extending upwardly within said container and another portion extending downwardly below said container, said cutting member having a central bore therethrough to provide an upward passage into said container, said central bore diverging radially outwardly and upwardly towards the interior of said container, said aerating tool having an elongated handle with a part thereof extending upwardly along the side wall of the container, the upper part of said handle being bent inwardly to facilitate vertical suspension of the aerator, said handle having a portion extending along and in contact with the container bottom, this last mentioned portion having an orifice in registry with the aperture in the container bottom, said orifice being internally threaded, and said cutting member having external threads matching the internal threads in said orifice, and locking means for retaining said cutting member in said orifice.

References Cited in the file of this patent

UNITED STATES PATENTS

| | | |
|---|---|---|
| 1,044,109 | Weaver | Nov. 12, 1912 |
| 1,653,994 | Emmet | Dec. 27, 1927 |
| 1,982,749 | Leeberg | Dec. 4, 1934 |
| 2,140,266 | Leeberg | Dec. 13, 1938 |
| 2,899,231 | Steiner | Aug. 11, 1959 |

FOREIGN PATENTS

| | | |
|---|---|---|
| 143,451 | Australia | Sept. 17, 1951 |
| 9,188 | Great Britain | June 19, 1884 |
| 522,286 | Great Britain | June 13, 1940 |
| 856,537 | Great Britain | Dec. 21, 1960 |

OTHER REFERENCES

Farm Implement and Machinery Review, May 1, 1944, vol. 70, No. 829, page 48 only.